United States Patent [19]

Million et al.

[11] Patent Number: 4,671,448

[45] Date of Patent: Jun. 9, 1987

[54] METHOD OF PREPARING STRUCTURAL COMPONENTS HAVING A SYMMETRICALLY CURVED WALL BY BUILDUP WELDING

[75] Inventors: Karl Million; Horst Zimmerman, both of Oberhausen, Fed. Rep. of Germany

[73] Assignee: M.A.N. Maschinenfabrik Augsburg-Nürnberg, Fed. Rep. of Germany

[21] Appl. No.: 743,051

[22] Filed: Jun. 10, 1985

[30] Foreign Application Priority Data

Jun. 19, 1984 [DE] Fed. Rep. of Germany ....... 3422638

[51] Int. Cl.⁴ ............................................. B23K 31/00
[52] U.S. Cl. .................................. 228/119; 219/76.12
[58] Field of Search ............... 219/76.12, 76.14, 76.15, 219/76.16; 228/119

[56] References Cited

U.S. PATENT DOCUMENTS

| | | | |
|---|---|---|---|
| 1,533,300 | 4/1925 | Baker | 219/76.12 |
| 4,149,061 | 4/1979 | Mort et al. | 219/76.14 |
| 4,517,434 | 5/1985 | Million et al. | 219/76.12 |

FOREIGN PATENT DOCUMENTS 2542081  9/1975  Fed. Rep. of Germany ... 219/76.14

OTHER PUBLICATIONS

Müller, 1971, Krupp GmbH.

*Primary Examiner*—Nicholas P. Godici
*Assistant Examiner*—Karen Skillman
*Attorney, Agent, or Firm*—McGlew and Tuttle

[57] ABSTRACT

In a method of preparing from weld material a component having a curvature which is symmetrical in rotation, difficulties arise, more particularly in the case of large and heavy components, in guiding the treatment zone. The treatment zone remains in a horizontal positio for welding, on stationary welding heads. For economic form welding under numerical control, it is proposed that the rotational axis of the component be tilted stepwise, to an extent depending upon the advance of the buildup of weld material layers, around a horizontal axis perpendicular to the rotational axis, the welding heads being adjusted stepwise as the tilt position varies.

7 Claims, 4 Drawing Figures

METHOD OF PREPARING STRUCTURAL COMPONENTS HAVING A SYMMETRICALLY CURVED WALL BY BUILDUP WELDING

FIELD AND BACKGROUND OF THE INVENTION

This invention relates in general to a method of forming structural elements and in particular to a new and useful method of forming an element having a symmetrically curved wall from buildup weld beads which are added during rotation of the element being formed.

The invention relates to a method of and apparatus for preparing from weld material, by the buildup thereof by multilayer buildup welding, a component having wall contours, more particularly diverging wall contours, with curvatures symmetrical in rotation. The treatment zone of the component is rotated around its axis of symmetry as rotational axis, being guided, while always remaining in a horizontal position for welding, along welding heads which remain stationary during the application of a discrete weld bead layer.

Making components entirely of weld material is known as form welding. The method can be used for the rapid and economic production of high grade products from low alloy and high alloy steels, such as connections or flanges or adapters for nuclear engineering purposes, the components having material qualities which comply with the most stringent material requirements. The kind of welding used is submerged welding, a mechanized method which is very productive and has proved very satisfactory in many areas of apparatus construction. The main advantages accruing from producing structural elements by form welding are relatively short production times, relatively low manufacturing costs and the possibility of an article being shaped integrally without a longitudinal seam.

In conventional submerged welding in which weld beads are applied in layers by means of melting electrodes, the treatment zone of an electrode must be guided along stationary welding heads while always remaining positioned horizontally for welding. This requirement causes considerable difficulties in the production of components which have wall contours, more particularly diverging wall contours, having rotationally symmetrical curvatures and which may be bulky and weigh several tons. The difficulties are heightened by the need for the welding heads to be guided very accurately in the horizontal position for welding if the end product is to be of the required high standards of material quality and free from any defect. Just a single discontinuity by a departure from correct guidance of the welding heads would lead to the end product being rejected in subsequent acceptance testing.

SUMMARY OF THE INVENTION

The invention provides a method of preparing a component which has a rotationally symmetrical curvature, more particularly in the form of diverging wall contours, by building up the component from weld material by form welding, with the aim of providing a totally defect free very high quality product. The invention ensures that the method is very economical, simple to perform and readily overseeable and is more particularly suitable for implementation by a numerical control program.

According to the invention, a method of preparing from weld material by the buildup thereof of multilayer buildup welding, a component having wall contours, more particularly diverging wall contours, with curvatures symmetrical in rotation, as hereinbefore set out, comprises tilting the rotational axis stepwise to an extent depending upon the advance of the buildup of weld material layers, around a horizontal axis perpendicular to the rotational axis, and adjusting the welding head stepwise in adaptation to the tilt and also as the tilting varies.

A great advantage provided by the method according to the invention is that the welding electrodes are given optimum guidance in the treatment zone in all the phases of the production process and at all times, as a treatment zone of the component is guided, while always remaining in a horizontal position for welding, along stationary welding heads, by stepwise tilting of the rotational axis to an extent depending upon the advances of the buildup of weld material and by stepwise adjustment of the welding heads as the tilt position varies.

A feature providing an advantageous and uncomplicated version of the method is that the welding heads are adjusted or readjusted by movement patterns controllable in two directions, namely horizontally, i.e., radially of the wall contour in the treatment zone, and vertically, i.e. at a distance therefrom.

The advantage here is that the proposed wall contour curvature is observed very accurately since the welding heads are in a position which has been determined relatively to the center of wall contour curvature and are readjusted appropriately in response to any change in the tilt position in order to maintain or restore the same. For example, the necessary movement patterns can be calculated from a drawing and converted into a numerical control program.

According to another advantageous feature for performing the method according to the invention by means of a preset control for each weld bead layer a tilt angle step is set which corresponds to the total curvature angle of the wall contour divided by the number of weld bead layers needed to build up the component in the curvature zone.

Advantageously in this case, after a weld bead layer filling up the entire width of the wall of the component has been applied, the tilt angle is varied by one angle step.

As a guarantee for satisfactory performance of the method, after one revolution of the component the tilt angle is corrected, preferably automatically, for example, by an optical control.

This step has the advantage of detecting and correcting a possible deviation from the proper relative setting of the welding head and the component before any damage occurs.

Consequently, the resulting very simple and reliable method according to the invention can be used with advantage for automatic control by a numerical control program, more particularly thanks to the feature of the stepwise sequence of tilt angle variations and the stepwise analog follow-up of welding head position.

In this case, a component having different radii of curvature, such as a base having a compound curvature, can, with advantage, be built up automatically to a predetermined program, the buildup proceeding upwardly.

An advantageously uncomplicated determination of the angle $\alpha_1$ which the tilted rotational axis includes with the vertical is equal to the angle $\alpha_2$ included between the tilt plane and a horizontal line prolonged from the center of curvature of the component wall beyond the treatment zone of the component.

Accordingly, it is an object of the invention to provide an improved method of forming a structure by welding using stationary positioned welding heads which comprises applying successive welds to a support as a support with the weld material is rotated to form multilayer buildup welds extending vertically upwardly and in succession with the stationary positioned welding heads acting effectively in the treatment zone.

A further object of the invention is to provide an improved method for welding which may be carried out economically and simply.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
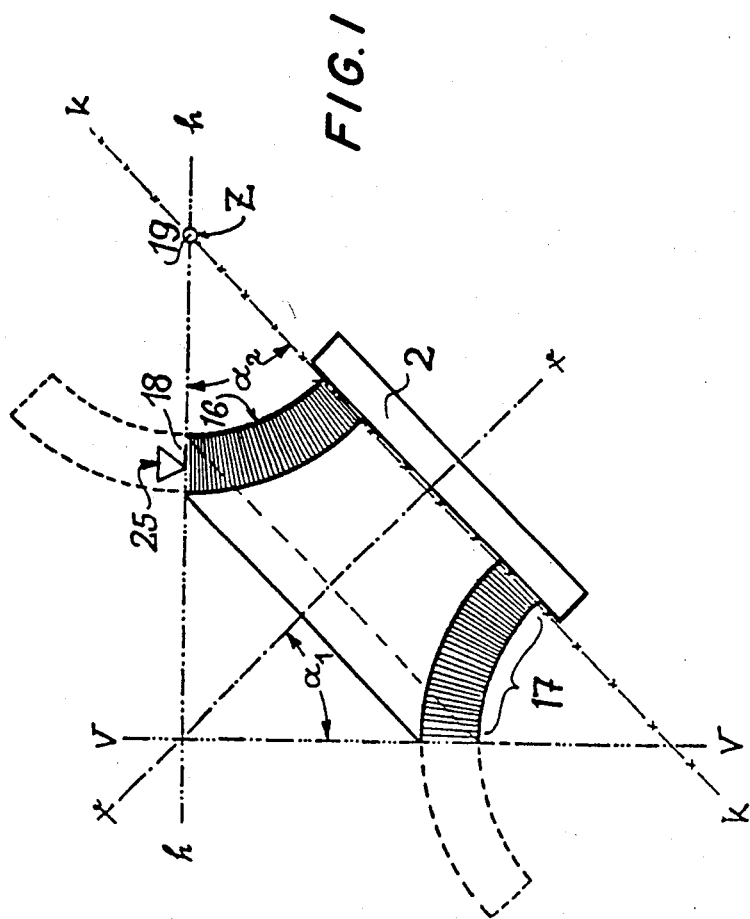
FIG. 1 is a diagrammatic illustration of a tilted position of a component in process of production.

Referring to the drawings in particular the invention disclosed therein comprises a method for forming a structure by welding which is effected the use of a stationary welding head 7 having individual electrodes 24 which act in a treatment zone to form a succession of welds or weld material deposits on a turntable support 2 to form a component 4 having curved walls. In accordance with the method, the component is tilted on a supporting tilting frame 1 after each successive weld bead buildup is formed at a deposit or treatment zone 18. The components 4 have rationally symmetrical three dimensional curved wall contours.

Figure 2:
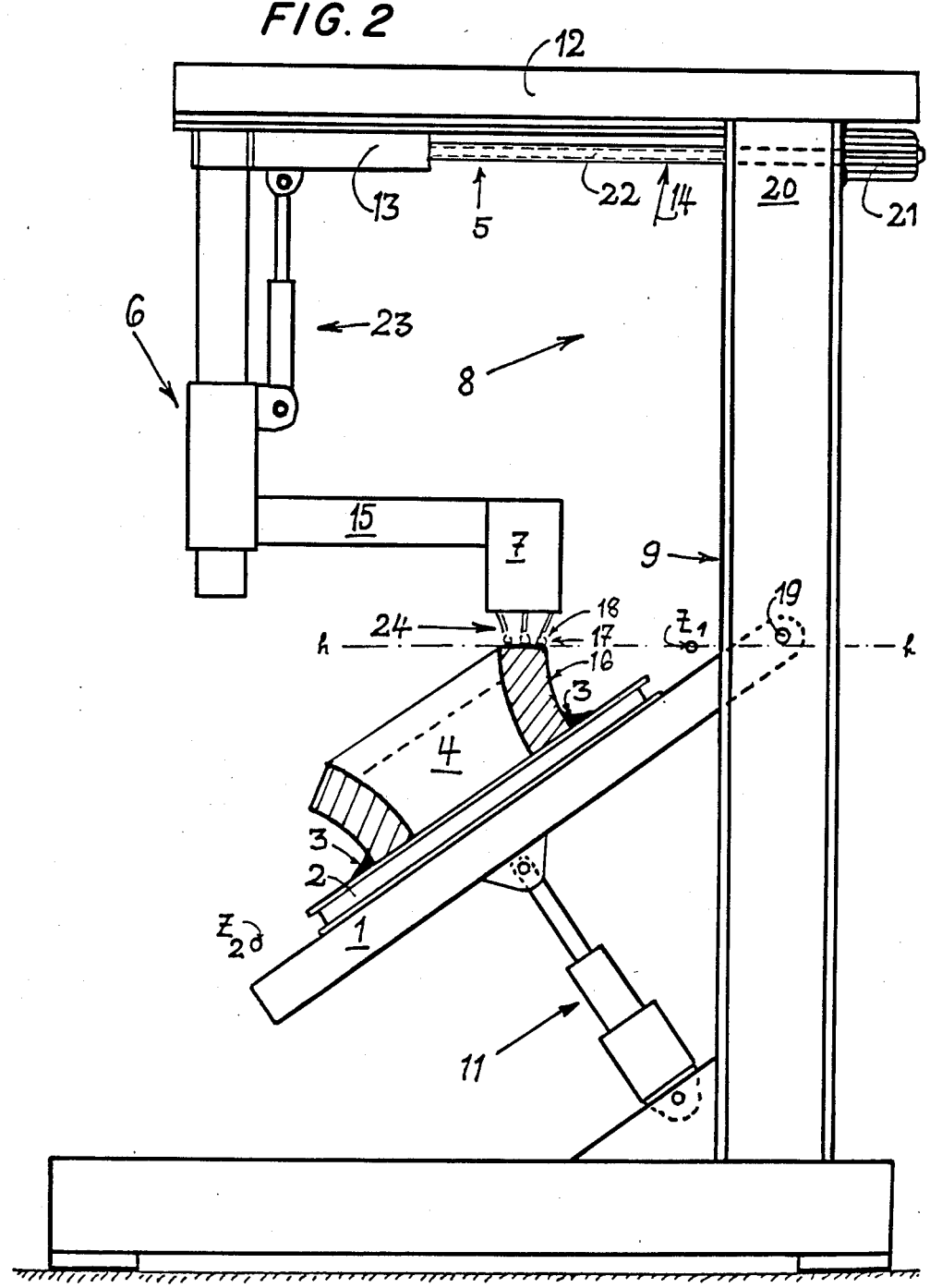
FIG. 2 is an illustration, in diagrammatic form and in side elevation and partly sectioned, of an apparatus for producing a component.

The method according to the invention can be carried into effect as follows:

Referring to FIGS. 1 and 2, a component 4 clamped on a turntable 2 has been built up, to the extent indicated by solid lines, by form welding in discrete weld bead layers 17. The component 4 rotates around its rotational axis X—X at an angular velocity corresponding to the rate at which the layer 17 builds up. To ensure that treatment zone 18 of component 4 always remains in the horizontal position for welding, the axis X—X is tilted stepwise, to an extent depending upon the advance of the buildup of the layer 17, around a horizontal axis 19 perpendicular to the axis X—X. The buildup of weld material is indicated purely symbolically by a triangle mark 25. The angle $\alpha_1$ which the tilted axis X—X includes with the vertical axis V—V is equal to the angle $\alpha_2$ included between tilt plane k—k and a horizontal line h—h prolonged from center Z of curvature of component wall 16 beyond treatment zone 18. In the example shown the tilt plane k—k coincides with the tilt axis 19 and the center Z of curvature. However, this is not an essential feature of the method. The tilt plane k—k can readily be displaced parallel to itself from the position shown. The important feature is that the horizontal line h—h connects the center Z of curvature of wall 16 to the treatment zone 18. The condition is then complied with that, as the component 4 rotates around its axis x—x, the treatment zone 18 always remains in the horizontal position for welding.

An appropriate apparatus for performing the method is shown in purely diagrammatic form in FIG. 2. The component 4 is clamped on a turntable 2 by clamping means 3. The turntable 2 and its drive (not shown) is disposed on a tilting frame 1. The same is so secured to a column 9 of a steel structure 8 as to be pivotable around a pivot 19. A steplessly adjustable tilting drive 11 ensures that a predetermined tilt setting is observed. An arm 12 cantilevers out from top 20 of structure 8, serves to guide welding head 7 and has a horizontally mobile slide 23. The same, in cooperation with a horizontal guide 5, is adapted to provide horizontal adjustment of the head 7. Vertical adjustment thereof is provided by a vertical guide 6 connected to the slide 23, and the same can be horizontally adjusted stepwise by motor means, such as a stepping motor 21 and a drive spindle 22. The vertical guides 6 can be operated, for instance, by a reciprocating hydraulic actuator 23. Head 7 is mounted on the vertical guide 6 by means of a member 15. In the embodiment shown three parallel guided electrodes 25 provide buildup welding of each weld bead layer 17 simultaneously. In the example shown, center $Z_1$ of curvature of component wall 16 must not lie on axis 19. However, a horizontal line h—h connects center $Z_1$ to treatment zone 18 of electrodes 24.

Figure 3:
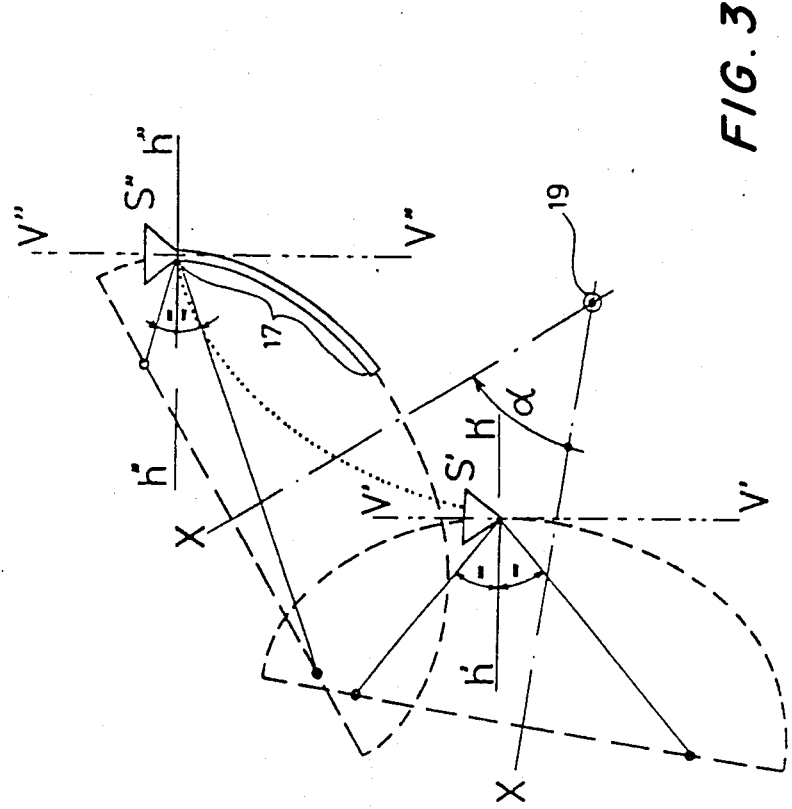
FIG. 3 diagrammatically illustrates the welding of an elliptical base.
Figure 4:
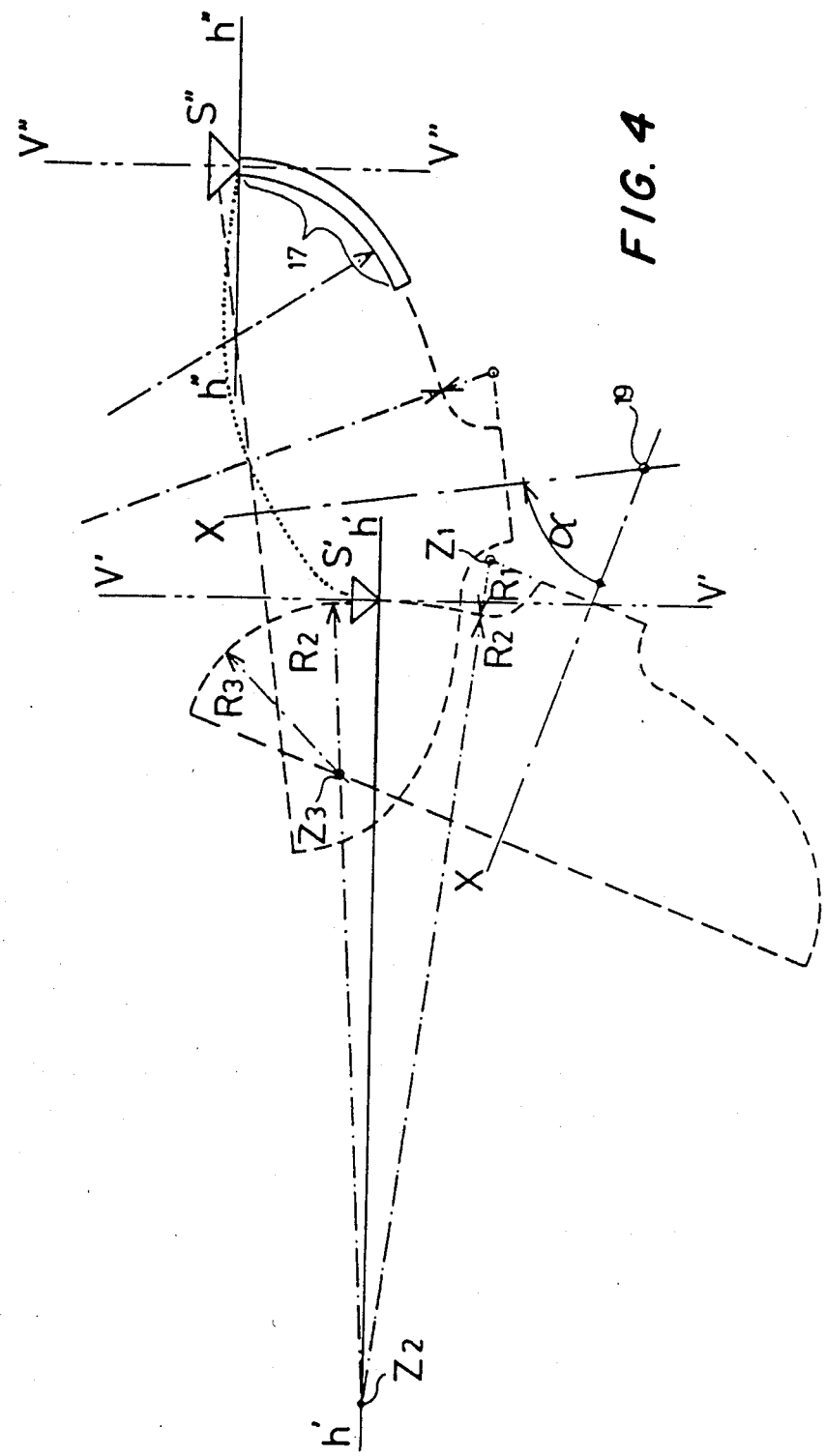
FIG. 4 diagrammatically illustrates the welding of a base having a compound curvature.

The diagrammatic views in FIGS. 3 and 4 show the end positions for the start and finish of any weld zone 17, the figures showing weld spots S', S", vertical tangents V', V" and horizontal welding planes h', h".

While a specific embodiment of the invention has been shown and described in detail to illustrate the application of the principles of the invention, it will be understood that the invention may be embodied otherwise without departing from such principles.

What is claimed is:

1. A method of preparing components having rotationally symmetrical three dimensional curved wall contours, from weld material deposits, and using welding heads to make the deposits at deposit zones comprising applying successive weld material deposit layers in vertically upward succession at the deposit zone of the component being formed with the welding heads, rotating the component around its axis symmetry while the welding heads remain stationary for at least one rotation of the deposit zone to form each layer on the component, deposition of the layers taking place from the bottom upwardly, tilting the rotational axis of the component about a horizontal axis which is perpendicular to the axis of symmetry in steps to an extent depending upon the advance of buildup of the weld material layers as successive layers are applied, moving the welding heads horizontally and vertically of the wall contours of the component being formed and in a path defined by contact points with the horizontal and vertical movements of the welding heads made using a numerical control program.

2. A method according to claim 1 including making the horizontal and vertical movements of the welding heads on a coordinate system which is disposed in a plane perpendicular to the tilt axis of the component, the coordinate system having its center at the tilt axis.

3. A method according to claim 2, wherein for each weld layer a tilt angle step is set for tilting which corresponds to the total curvature angle of the wall contour divided by the number of weld layers needed to build up the component.

4. A method according to claim 2, wherein after at least one weld layer is formed to fill up the entire width of the component being formed, the tilt angle is varied by an angle step.

5. A method according to claim 2, wherein the numerical control program is used to provide automatic control of the stepwise sequence of tilt angle of the component being formed and an analog follow-up of the welding head position is effected therefrom.

6. A method according to claim 2, wherein the buildup of a component having different radii of curvature, such as a base with a compound curvature is carried out automatically in an upward direction in accordance with the control program.

7. A device for forming a component having rotationally symmetrical three dimensional curved wall contours, from weld material deposits, comprising a support, a tilting frame rotably mounted about a horizontal axis to said support, a turntable rotatably mounted to said tilting frame about a rotation axis which is perpendicular to said horizontal axis, said turntable being for receiving said weld material at a rotating deposit zone on the turntable from welding heads to form the component, a plurality of welding heads mounted for horizontal and vertical movement over the deposit zone, means connected between said support and said welding heads for moving said welding heads horizontally and vertically over the deposit zone, means connected to said tilting frame for pivoting said tilting frame on its horizontal axis and thereby tilting said rotation axis, and numerical control means connected to said welding head moving means and to said tilting frame moving means for holding said welding heads at a fixed location over the deposit zone for at least one rotation of the turntable, for tilting the turntable to tilt the rotation axis by a selected amount after the deposit of each layer and for moving the welding heads vertically and horizontally to follow the contour of the component to form a new layer thereon.

* * * * *